June 20, 1944.  C. J. T. YOUNG  2,351,797
ANTI-GLARE DEVICE
Filed Aug. 26, 1942

Clinton J. T. Young
INVENTOR.
BY Donald C. Brown
Attorney

Patented June 20, 1944

2,351,797

UNITED STATES PATENT OFFICE 2,351,797

ANTIGLARE DEVICE

Clinton J. T. Young, Cambridge, Mass., assignor to Polaroid Corporation, Cambridge, Mass., a corporation of Delaware Application August 26, 1942, Serial No. 456,187

12 Claims. (Cl. 88—65)

This invention relates to antiglare devices, and more particularly to polarizing visors adapted for use in connection with automobile headlight systems employing polarized light.

In such systems it has been proposed to provide all automobiles with headlights emitting polarized light of predetermined polarization characteristics, and to equip each automobile also with suitable polarizing visor means adapted to block polarized light from the headlights of another automobile approaching from the front. One difficulty existing in such systems is that the relation between the headlights and analyzers of approaching cars with respect to their transmission axes may be materially altered by irregularities in the road surface, such for example as a high crown. If two approaching cars are materially tipped in opposite directions from a substantially level position, and if the visor means therein be fixedly mounted, the result will be to rotate the visor in each car from its position of maximum extinction of the headlights of an approaching car, with the resulting transmission of a substantial amount of glare-producing light.

It is accordingly one object of the present invention to overcome this difficulty by providing polarizing visor means adapted to be adjusted within the car to compensate for such tipping of the car wherein it is mounted or of an approaching car, and to provide also means for readily indicating to the driver of the car the direction in which the visor should be tipped to accomplish the desired adjustment.

Another object of the invention is to provide an adjustable polarizing visor of the above type provided with one or more relatively small areas of predeterminedly different polarization characteristics from the main area of said visor and serving to indicate to the driver of the automobile wherein the visor is mounted the direction in which it should be tipped to compensate for tipping of the car itself or of an approaching car.

Further objects are to provide such polarizing visor means wherein the indicating means comprise two relatively small polarizing areas each with the transmission axis thereof at a predeterminedly different angle to the transmission axis of the main area of said visor, whereby, when the car wherein said visor is mounted is tipped, one of said areas will appear darker and the other will appear lighter than the main area of said visor; to provide such visor means wherein the indicating means comprise two relatively small areas comprising half-wave retardation material each with the principal vibration direction thereof at a predeterminedly different angle to the transmission axis of the polarizing material of said visor; to provide such visor means wherein the indicating means comprise a relatively small area of birefringent material combined with the polarizing material of said visor in such manner as to transmit light of one color when the car wherein it is mounted is tipped in one direction, and to transmit light of a different color when said car is tipped in the opposite direction; and to provide such visor means wherein diffusing material is combined with said indicating means to facilitate use thereof.

Other objects and advantages will in part be apparent and in part be pointed out in the course of the following description of one or more embodiments of the invention, which are given as non-limiting examples, in connection with the accompanying drawing, in which.

Figure 1:
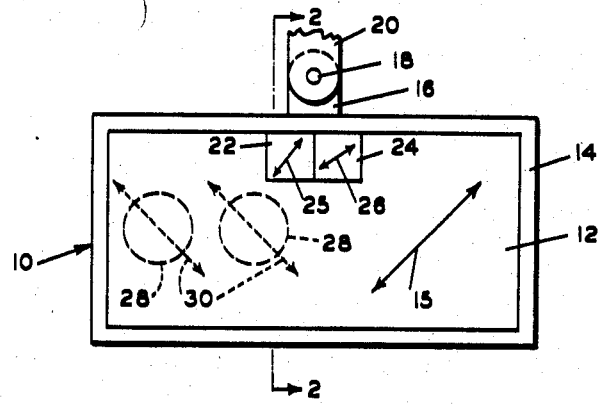
Figure 1 is a diagrammatic view illustrating the operation of a polarizing visor provided with indicating means comprising an embodiment of the present invention.

One of the systems of polarized headlighting most often proposed employs headlights and analyzers whose transmission axes are all inclined at an angle of substantially 45 degrees to the horizontal. Fig. 1 shows a visor 10 suitable for use in such a system comprising a sheet 12 of light-polarizing material mounted within a suitable frame 14 and having its transmission axis in the position indicated by arrow 15. Frame 14 may be provided with any suitable adjustable means for mounting within a car, such for example as arm 16 secured as by means of pin 18 to a second arm or bracket 20 adapted for mounting within a car. Said connection will preferably be sufficiently tight to insure visor 10 remaining in any position to which it is moved by rotation about pin 18.

According to the invention, it is proposed to provide visor 10 with supplemental areas of different polarization characteristics and adapted to operate differently from the body of said visor on the light emitted by the headlights of an approaching car—either with respect to intensity or with respect to color—and thereby to indicate the direction in which the visor should be rotated, or tipped to compensate for tipping of one or both cars. This result may be achieved in a variety of ways, and several will be given by way of illustrative examples, although it is to be understood that the invention is not limited thereto.

In one form of the invention, areas 22 and 24 may comprise light-polarizing material with the transmission axes thereof set at predetermined angles to the transmission axis of polarizing area 12. For example, area 22 may have its axis at an angle of approximately 50 degrees to the horizontal, as indicated by arrow 25, and area 24 may have its axis at an angle of approximately 40 degrees to the horizontal, as indicated by arrow 26. When the car wherein visor 10 is mounted is traveling along a level road, the light emitted by the headlights of an approaching car will be vibrating at substantially 45 degrees to the horizontal and will be absorbed by polarizing area 12, as is indicated in Fig. 1 by dotted circles 28, which represent the polarizing headlights of an approaching car having transmission axes as indicated by arrows 30. Under these conditions, both of areas 22 and 24 will transmit more light than area 12, but each will transmit substantially the same amount of light and will accordingly balance the other.

If either the car wherein visor 10 is mounted or an approaching car be tipped from a substantially level position, it will be seen that the result will be to change the angular relation between the transmission axes of area 22 and headlights 30 as represented by arrows 30 and arrow 15. For example, if the car wherein visor 10 is mounted be tipped downward to the right, visor 10 will be similarly tipped, with the result that arrows 30 and arrow 15 will no longer be relatively perpendicular. On the other hand, this tipping will result in bringing arrow 25, representing the transmission axis of area 22, into a position more nearly perpendicular to arrows 30 than either arrow 15 or arrow 26. Area 22 will therefore appear darker than the body of the visor, and area 24 will be correspondingly lighter than area 12. The driver of the car will thereby realize that visor 10 should be tilted downward at the left, that is to say, at the side nearer area 22, which tipping will bring arrow 15 back again into a position relatively perpendicular to arrows 30, namely, the position of maximum extinction for area 12 with respect to headlights 28.

It is believed that the converse of the above situation will be equally clearly understood. If either car is tipped in such manner as to bring arrow 26 into a position more nearly perpendicular to arrows 30 than either arrow 15 or arrow 25, area 24 will then appear darker than area 12 of the visor and area 22 will be still lighter. The driver of the car will thereby realize that the visor should be tipped downwards at its right-hand side to bring visor 10 back again into the position of maximum extinction with respect to headlights 28.

The above-described device may be constructed in a variety of ways. For example, referring to Fig. 2, the body of the visor may comprise a sheet of light-polarizing material 32 bonded between two sheets of glass 33, as by means of two layers of adhesive 34. Supplemental polarizing material 35 for forming areas 22 and 24 may be fitted within a cut-out portion in sheet 32.

Figure 3:
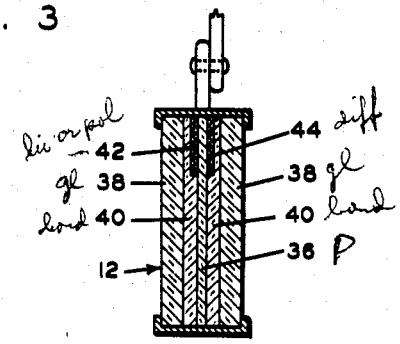
Fig. 3 is a view similar to Fig. 2 showing a further modification of the invention.

An alternative construction for the main body 12 of visor 10 is shown in Fig. 3, wherein layer 36 represents a sheet of light-polarizing material bonded between two glass plates 38 by means of adhesive layers 40. Adjacent supplemental areas of polarizing material 42 may be superimposed on layer 36 within one of adhesive layers 40, with the transmission axes thereof in the desired relation to the transmission axis of layer 36, as indicated by arrows 15, 25 and 26 in Fig. 1. Alternatively, areas 42 may be superimposed on the outer surface of one of glass plates 38 and bonded in position as by means of a suitable lacquer. In either case, it should be pointed out that areas 42 should be on the outer side of layer 36, that is to say, between layer 36 and the headlights of an approaching car.

Instead of polarizing material in areas 42, similar results may be obtained with half-wave retardation material positioned adjacent the outer surface of polarizing layer 36 with the principal vibration directions thereof bearing substantially the same relation to the transmission axis of layer 36 as arrows 25 and 26 bear to arrow 15 in Fig. 1. Although the preferred construction in all of these cases is to mount the supplemental material for tipping with the body of the visor, it is also within the scope of the invention to mount them independently.

It will also be found desirable to provide a layer of light-diffusing material in superimposed relation with areas 22 and 24, as is indicated at 44 in Fig. 3. With this arrangement it is unnecessary for the driver of the car to interpose areas 22 and 24 directly between his eyes and the headlights of an approaching car. Diffusing material will also be found desirable with the arrangement shown in Fig. 2.

Figure 4:
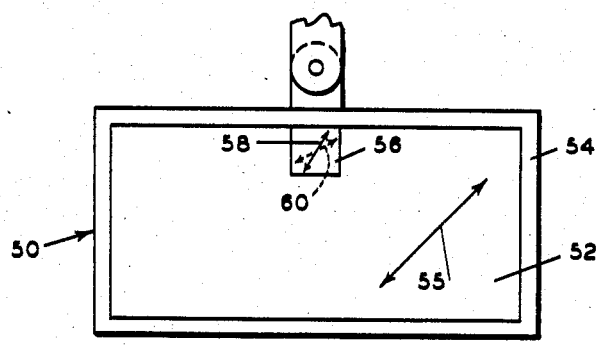
Fig. 4 is a view similar to Fig. 1 showing a modified form of the indicating means of the invention.

A further modification of the invention is shown in Fig. 4, wherein elements 50, 52, 54 and 55 correspond to elements 10, 12, 14 and 15 in Fig. 1. Area 56 may comprise polarizing material mounted in the manner indicated at 35 in Fig. 2 or at 42 in Fig. 3, and with its transmission axis in the position indicated by either arrow 58 or arrow 60. With this arrangement it will be seen that tipping of one or both cars in the manner described above in connection with Fig. 1 will result in causing areas 52 and 56 to transmit relatively different amounts of the light emitted by the polarizing headlights of an approaching car, and the tipping may be compensated for in the same manner as described in connection with Fig. 1. For example, if the transmission axis of area 56 be as indicated by arrow 58 and the car wherein visor 50 is mounted is tipped downwards at the right, area 56 will appear darker than area 52, and the driver will therefore know that visor 50 should be tipped downwards at his left-hand side. Similarly, if the tipping of the car be in the opposite direction, the driver will understand that it may be compensated for by tipping the visor downwards along its right-hand side. The converse of these conditions will hold if the transmission axis of area 56 be as indicated by arrow 60.

Figure 2:
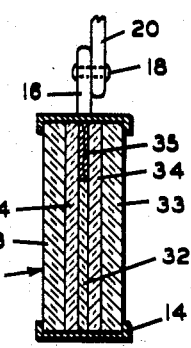
Fig. 2 is a sectional view on the line 2—2 of Fig. 1.

It will be understood that instead of forming area 56 in the manner illustrated in Fig. 2, the construction shown in Fig. 3 may be utilized, and in the latter case, instead of using additional polarizing material, a layer of half-wave retardation material may be used with its principal vibration direction in the position indicated by either arrow 58 or arrow 60. In both of these cases, it will be desirable to use a layer of diffusing material in the manner indicated at 44 in Fig. 3.

In another modification of the form of the invention shown in Fig. 4, area 56 may comprise a plurality of sheets of birefringent material superimposed upon the polarizing material in layer 36 in the manner indicated at 42 in Fig. 3. For example, layer 42 may comprise two sheets of two-thirds wave retardation material, one having its principal vibration direction in the position indicated by arrow 58 and the other having its principal vibration direction in the position indicated by arrow 60. With this arrangement, tipping of one or both cars in the manner described in connection with Fig. 1 will result in a change in the predominant color of the light transmitted by area 56. For example, if the car wherein visor 50 is mounted be tipped downwards at the right with respect to the headlights of an approaching car, the light transmitted by area 56 may be predominantly yellow, and if it be tipped downwards at the left, the light transmitted by area 56 may be predominantly blue. It will be understood that other colors may be obtained, depending upon the degree of birefringence of the material used and its arrangement with respect to the relation of the vibration directions thereof and the transmission axis of the polarizing material in the visor. Any and all such arrangements are to be construed as coming within the scope of the invention.

With the above described embodiment of the invention, it is necessary only that the driver of the car remember the relation between the predominant color transmitted by area 56 and the direction in which the visor should be tipped to restore it to the position of maximum extinction. Obviously this arrangement may be facilitated by the incorporation of suitable legends on the two sides of the visor. For example, if to compensate for predominantly blue light in area 56 it be necessary to tip visor 50 downwards at its left-hand side, the word "Blue" may be written or otherwise mounted in said side; and similarly for light of another color at the right end of the visor. Similar modifications of the invention will also be apparent to those skilled in the art and are to be construed as coming within the scope thereof.

What is claimed is:

1. A visor for use in an automotive vehicle or the like comprising, in combination, transparent light-polarizing means adapted to block substantially all plane polarized light vibrating in a predetermined direction and incident thereon, supplemental light-transmitting means for indicating the vibration direction of plane polarized light incident on said visor and vibrating at an angle to said predetermined direction, said last named means comprising anisotropic means associated with said light-polarizing means and having the principal vibration direction thereof at a predetermined angle to the axis of said light-polarizing means, and means for so mounting said visor that it may be tipped to block substantially said last-mentioned plane polarized light.

2. A visor for use in an automotive vehicle or the like comprising, in combination, transparent light-polarizing means adapted to block substantially all plane polarized light vibrating in a predetermined direction and incident thereon, supplemental light-transmitting means, comprising a supplemental light-polarizing element positioned with its polarizing axis at an angle to the polarizing axis of said first-mentioned polarizing means, for indicating the vibration direction of plane polarized light incident on said visor and vibrating at an angle to said predetermined direction, and means for so mounting said visor that it may be tipped to block substantially said last-mentioned plane polarized light.

3. A visor for use in an automotive vehicle or the like comprising, in combination, transparent light-polarizing means adapted to block substantially all plane polarized light vibrating in a predetermined direction and incident thereon, supplemental light-transmitting means, comprising a plurality of supplemental light-polarizing elements positioned with their transmission axes at an angle to one another and with the transmission axis of said polarizing means intersecting said angle, for indicating the vibration direction of plane polarized light incident on said visor and vibrating at an angle to said predetermined direction, and means for so mounting said visor that it may be tipped to block substantially said last-mentioned plane polarized light.

4. A visor for use in an automotive vehicle or the like comprising, in combination, transparent light-polarizing means adapted to block substantially all plane polarized light vibrating in a predetermined direction and incident thereon, supplemental light-transmitting means, comprising light-diffusing means overlying a supplemental light-polarizing element having its transmission axis angularly positioned with respect to the transmission axis of said first-mentioned polarizing means, for indicating the vibration direction of plane polarized light incident on said visor and vibrating at an angle to said predetermined direction, said supplemental means being relatively small in comparison with the total area of said visor and being spaced from the normal line of vision through said visor, and means for so mounting said visor that it may be tipped to block substantially said last-mentioned plane polarized light.

5. A visor for use in an automotive vehicle or the like comprising, in combination, transparent light-polarizing means adapted to block substantially all plane polarized light vibrating in a predetermined direction and incident thereon, supplemental light-transmitting means, comprising a double refracting element positioned to overlie a portion less than the whole of said light-polarizing means with a principal vibration direction of said double refracting element positioned at an acute angle to the transmission axis of said polarizing means, for indicating the vibration direction of plane polarized light incident on said visor and vibrating at an angle to said predetermined direction, and means for so mounting said visor that it may be tipped to block substantially said last-mentioned plane polarized light.

6. A visor for use in an automotive vehicle or the like comprising, in combination, transparent light-polarizing means adapted to block substantially all plane polarized light vibrating in a predetermined direction and incident thereon, supplemental light-transmitting means, comprising light-diffusing means and a double refracting element positioned to overlie a portion less than the whole of said light-polarizing means with a principal vibration direction of said double refracting element positioned at an acute angle to the transmission axis of said polarizing means, for indicating the vibration direction of plane polarized light incident on said visor and vibrating at an angle to said predetermined direction, said supplemental means being relatively small in comparison with the total area in said visor and being spaced from the normal line of vision through said visor, and means for so mounting said visor that it may be tipped to block substantially said last-mentioned plane polarized light.

7. A visor for use in an automotive vehicle or the like comprising, in combination, transparent light-polarizing means adapted to block substantially all plane polarized light vibrating in a predetermined direction and incident thereon, supplemental light-transmitting means, comprising a plurality of superimposed sheets of double refracting material positioned to overlie a portion less than the whole of said light-polarizing means with the principal vibration directions of said sheets at angles to one another and to the transmission axis of said polarizing means, for indicating the vibration direction of plane polarized light incident on said visor and vibrating at an angle to said predetermined direction, and means for so mounting said visor that it may be tipped to block substantially said last-mentioned plane-polarized light.

8. A visor for use in an automotive vehicle or the like comprising, in combination, transparent light-polarizing means adapted to block substantially all plane polarized light vibrating in a predetermined direction and incident thereon, supplemental light-transmitting means, comprising a supplemental light-polarizing element positioned with its polarizing axis at an angle of approximately 5 degrees to the polarizing axis of said first-mentioned polarizing means, for indicating the vibration direction of plane polarized light incident on said visor and vibrating at an angle to said predetermined direction, and means for so mounting said visor that it may be tipped to block substantially said last-mentioned plane polarized light.

9. A visor for use in an automotive vehicle or the like comprising, in combination, transparent light-polarizing means adapted to block substantially all plane polarized light vibrating in a predetermined direction and incident thereon, supplemental light-transmitting means, comprising a plurality of supplemental light-polarizing elements positioned with their transmission axes at an angle of approximately 10 degrees to one another and with the transmission axis of said polarizing means intersecting said angle, for indicating the vibration direction of plane polarized light incident on said visor and vibrating at an angle to said predetermined direction, and means for so mounting said visor that it may be tipped to block substantially said last-mentioned plane polarized light.

10. A visor for use in an automotive vehicle or the like comprising, in combination, transparent light-polarizing means adapted to block substantially all plane polarized light vibrating in a predetermined direction and incident thereon, supplemental light-transmitting means, comprising at least one half-wave retardation element positioned to overlie a portion less than the whole of said polarizing means and having a principal vibration direction thereof at an acute angle to the transmission axis of said polarizing means, for indicating the vibration direction of plane polarized light incident on said visor and vibrating at an angle to said predetermined direction, and means for so mounting said visor that it may be tipped to block substantially said last-mentioned plane polarized light.

11. A visor for use in an automotive vehicle or the like comprising, in combination, transparent light-polarizing means adapted to block substantially all plane polarized light vibrating in a predetermined direction and incident thereon, supplemental light-transmitting means for indicating the vibration direction of plane polarized light incident on said visor and vibrating at an angle to said predetermined direction, and means for so mounting said visor that it may be tipped to block substantially said last-mentioned plane polarized light, said supplemental light-transmitting means being bonded to the outer surface of said light-polarizing means and comprising anisotropic means having the principal vibration direction thereof at a predetermined angle to the axis of said light-polarizing means.

12. A visor for use in an automotive vehicle or the like comprising, in combination, transparent light-polarizing means adapted to block substantially all plane polarized light vibrating in a predetermined direction and incident thereon, supplemental light-transmitting means, comprising a double refracting element overlying a polarizing element with a principal vibration direction thereof at an acute angle to the transmission axis of said polarizing element, for indicating the vibration direction of plane polarized light incident on said visor and vibrating at an angle to said predetermined direction, and means for so mounting said visor that it may be tipped to block substantially said last-mentioned plane polarized light.

CLINTON J. T. YOUNG.